United States Patent
Obata

(10) Patent No.: US 6,252,128 B1
(45) Date of Patent: Jun. 26, 2001

(54) POROUS SHEET

(75) Inventor: Soichi Obata, Ehime-ken (JP)

(73) Assignee: Kuraray Co., Ltd., Kurashiki (JP)

(*) Notice: Subject to any disclaimer, the term of this patent is extended or adjusted under 35 U.S.C. 154(b) by 0 days.

(21) Appl. No.: 09/587,573

(22) Filed: Jun. 6, 2000

(30) Foreign Application Priority Data

Jun. 7, 1999 (JP) .................................. 11-159680
Dec. 21, 1999 (JP) .................................. 11-362559

(51) Int. Cl.⁷ ............................................. A61F 13/00
(52) U.S. Cl. ................. 602/41; 602/42; 602/43; 602/44; 602/45; 602/46; 602/47
(58) Field of Search ........................... 602/41–47

(56) References Cited

FOREIGN PATENT DOCUMENTS 2-44739   11/1990   (JP) .

Primary Examiner—Michael A. Brown
Assistant Examiner—Lalita M. Hamilton
(74) Attorney, Agent, or Firm—Oblon, Spivak, McClelland, Maier & Neustadt, P.C.

(57) ABSTRACT

A porous sheet suitable for use in first-aid sticking plasters, poultices, etc. as the substrate is described. The porous sheet comprises a thermoplastic polymer, and an arbitrary cross section of the porous sheet has a polymer packing of 30 to 90% and contains 2 to 100 polymer sections having a sectional area of 0.001 mm$^2$ or less per millimeter along the surface of the porous sheet. At least one surface of the porous sheet is in net-work structure (a) formed by fiber-like bodies which are integrally bonded to each other at intersections by fusion of polymer constituting the fiber-like bodies and/or net-work structure (b) formed by fiber-like protrusions. With such structures, the porous sheet has a moderate air permeability, and is good in soft texture and highly resistant to fluff formation by rubbing.

5 Claims, 2 Drawing Sheets

50±10μm ically, porous sheets hav-
POROUS SHEET

BACKGROUND OF THE INVENTION

The present invention relates to porous sheets comprising thermoplastic polymer, more particularly porous sheets having specific porous structures on a cross section and roughened network structures on at least one surface of the sheets.

Non-woven fabrics comprising a collection of fibers have been known. Fibers forming non-woven fabrics are held together by adhesion or fusion at intersectional portions. Although part of fibers have sectional shapes some what deformed by heating, substantial part of fibers in the surface and inside of non-woven fabrics are in collected arrangement retaining their original shapes. Non-woven fabrics made of entangled fibers formed by needle punch entanglement or water jet entanglement instead of bonding fibers by adhesive or heat have been also known. These non-woven fabrics have been used in wide applications of clothing or non-clothing fields due to good flexibility, good air permeability and mellow appearance. However, known non-woven fabrics are unsuitable in some applications, for example, due to fluff formation during their use and requirement for air permeability smaller than usual.

As air-permeable materials, porous films have been known, which are manufactured by a method where thermoplastic polymer incorporated with a void-forming agent is stretched, a method where a void-forming agent is foamed during film-forming process, a method where a void-forming agent is extracted after film formation to produce porous structure, a method where a solution of a thermoplastic polymer and a void-forming agent is extruded into a coagulation bath to coagulate thermoplastic polymer solution thereby to produce porous structure, etc. Although the fine structures of porous films may be easily controlled in these methods, the selection of suitable void-forming agent is required in addition to relatively complicated production steps. In addition, thermoplastic polymer incorporated with a void-forming agent in an amount sufficient for obtaining intended air permeability is in some case difficult to be made into films depending on the addition amount, or fails to give films having practically high strength even when it can be made into films.

As described above, known non-woven fabrics and porous films do not meet the properties required in some application fields.

For example, in specific application as the substrates of first-aid sticking plasters, conventional substrates of low friction and high abrasion resistance are mainly made of films having poor air permeability. To make the film substrates air-permeable, holes should be formed in films or porous films should be used. However, films are poor in tactile properties and texture.

To improve the tactile properties and air permeability of films, for example, Japanese Utility Model No. 1917955 proposes to use sheets made of polyurethane elastic fibers as the substrates for first-aid sticking plasters. However, since the substrates are made of fiber sheet, fluffing occurs due to surface rubbing during their use.

Although the fluff formation may be reduced by increasing fiber size and fusing fibers at their intersections, this in turn makes texture excessively roughened. Alternatively, it is proposed to heat-treat the surface of fiber sheet, this making the production process complicated due to additional step of heat calendar treatment.

SUMMARY OF THE INVENTION

Accordingly, an object of the present invention is to provide porous sheets having a moderate air permeability and a soft texture without generating fluffs by rubbing, thereby eliminating the above problems of fluffing in known non-woven fabrics and poor texture of known porous films.

As a result of extensive studies made by the inventor, the above object has been achieved by a porous sheet comprising a thermoplastic polymer, a cross section of the porous sheet having a polymer packing of 30 to 90% and containing 2 to 100 polymer sections having a sectional area of 0.001 mm$^2$ or less per millimeter along the surface of the porous sheet, and at least one surface of the porous sheet being in the following net-work structures (a) and/or (b):

(a) net-work structure formed by fiber-like bodies which are integrally bonded to each other at intersections by fusion of polymer constituting the fiber-like bodies;

(b) net-work structure formed by fiber-like protrusions.

DETAILED DESCRIPTION OF THE INVENTION

Figure 1:
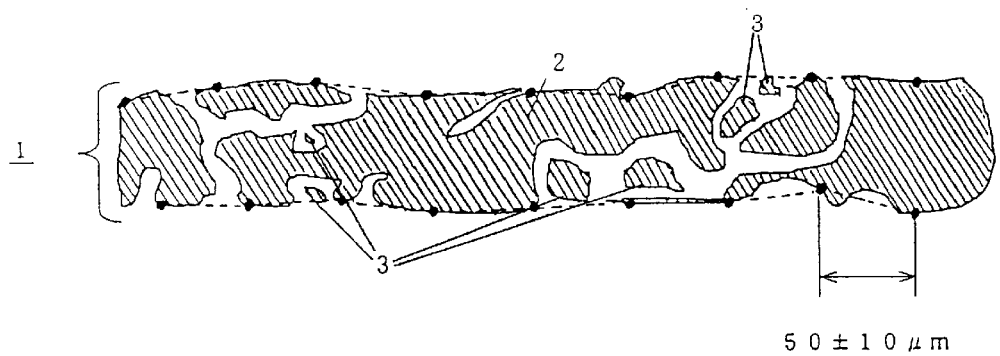
FIG. 1 is an enlarged cross-sectional illustration showing a porous sheet of the present invention.

Referring to the drawings, the porous sheets of the present invention will be described in more detail.

FIG. 1 is an enlarged cross-sectional illustration showing a porous sheet of the present invention. As seen from FIG. 1, a cross section 1 of the porous sheet is characterized by an empty space not occupied by polymer, a polymer section 2 having a relatively large sectional area and a polymer section 3 having a relatively small sectional area.

It is critical in the present invention that the polymer packing of an arbitrary cross section 1 is 30 to 90%, i.e., the cross section 1 is occupied by the polymer sections 2 and 3 in an area ratio of 30 to 90%. When the polymer packing is less than 30%, the volume of the empty space is too large and a sheet with such a small polymer packing is likely to have a cross section containing an increased number of polymer sections 3 having a small sectional area, thereby unfavorably lowering the abrasion resistance of the sheet to cause fluff formation. A polymer packing exceeding 90% results in failure to achieve an intended air permeability. Therefore, the polymer packing is preferably 30 to 85%, and more preferably 40 to 80%.

The polymer packing of the cross section of porous sheet, referred to herein, was determined by a method described below. In this method, several points were marked at regular intervals in the contours indicating the opposite surfaces of sheet and the points were connected in order to draw respective lines as shown in FIG. 1 by dotted lines. By assuming the lines as the contours defining the cross section of porous sheet, the sectional area of porous sheet was calculated.

It is also critical in the present invention that an arbitrary cross section of porous sheet as shown in FIG. 1 contains 2 to 100, preferably 3 to 75 isolated polymer sections having a sectional area of 0.001 mm$^2$ or less per millimeter along the surface of porous sheet. The polymer section having a sectional area of 0.001 mm$^2$ or less referred to herein is the polymer section 3 as shown in FIG. 1. When the number of the polymer sections having a sectional area of 0.001 mm$^2$ or less is larger than 100 per millimeter, the mechanical strength of porous sheet is lowered and the fluff formation by rubbing is likely to occur. In contrast, when the number of the polymer sections having a sectional area of 0.001 mm$^2$ or less is one or less per millimeter, the thickness of porous sheet is reduced to result in poor texture.

The polymer sections referred to herein include those having a sectional area of at least 0.00001 mm$^2$.

Figure 2:
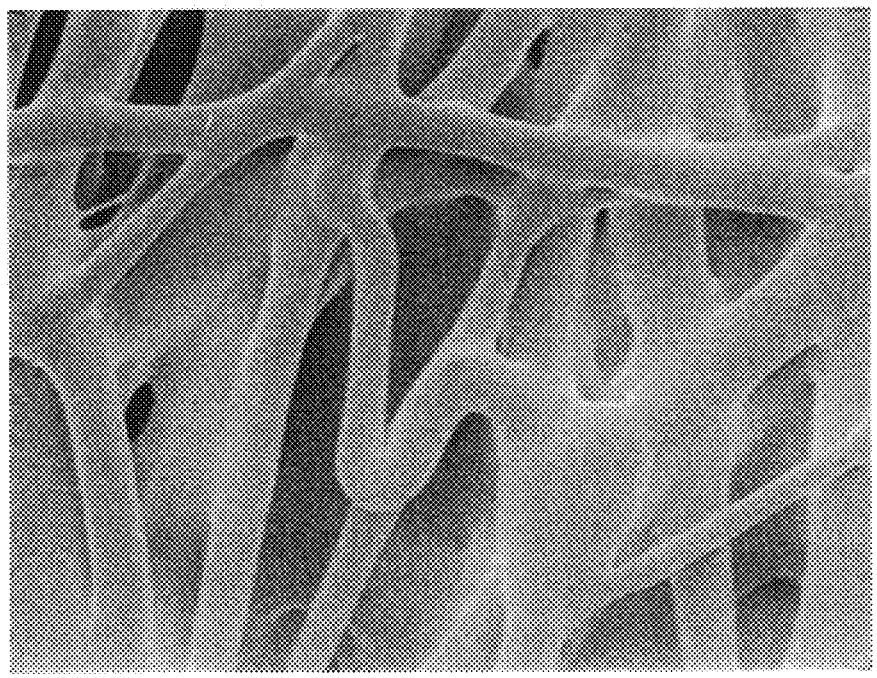
FIG. 2 is a photomicrograph showing a surface having the network structure (a) of a porous sheet of the present invention.
Figure 3:
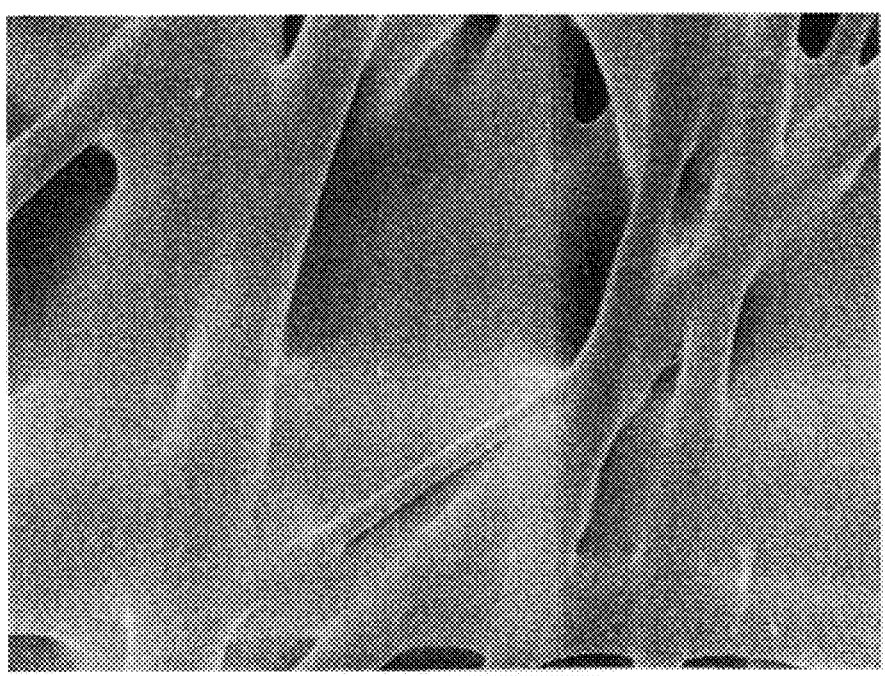
FIG. 3 is a photomicrograph showing a surface having the network structure (b) of another porous sheet of the present invention.

FIG. 2 is a photomicrograph showing a surface of a porous sheet of the present invention. A random arrangement of fiber-like bodies on the surface of porous sheet forms a network structure (a) in which the fiber-like bodies are integrally melt-bonded to each other at their intersections by fusion of polymer constituting the fiber-like bodies. FIG. 3 is a photomicrograph showing a surface of another porous sheet of the present invention. In FIG. 3, the melting of the polymer constituting the fiber-like bodies are further progressed as compared with FIG. 2 to cause integral melt-bonding of the fiber-like bodies at additional portions other than their intersections, thereby resulting in a network structure (b) formed by fiber-like protrusions.

With the network structures (a) and/or (b) only on either or both the opposite surfaces of porous sheet, the porous sheets of the present invention exhibit no or minimized fluffing by rubbing and create a soft texture like cloths.

The weight of porous sheet is not critical in the present invention, and preferably 10 to 200 g/m$^2$, more preferably 30 to 150 g/m$^2$ in view of practical use. The thickness of porous sheet may be suitably varied depending on the applications, and preferably 0.03 to 0.5 mm, more preferably 0.05 to 0.4 mm, and most preferably 0.1 to 0.4 mm.

The thermoplastic polymer usable in the present invention is not strictly limited, and various thermoplastic elastomers and resins are usable. Examples of the thermoplastic elastomers include polyolefin elastomers such as ethylene-α-olefin copolymers, polyurethane elastomers, styrene copolymer elastomers, polyester elastomers, polyamide elastomers, etc. Examples of the thermoplastic resins include polyolefin resins such as polypropylene and polyethylene, ethylene-vinyl alcohol copolymers, etc. Of the above, the thermoplastic elastomers are preferably used as the thermoplastic polymer in view of easiness of melt-bonding.

To ensure easy release of porous sheets from the net or roll in the production process described below and prevent the self-adhesion of resultant porous sheets, an additive such as lubricant may be added to the thermoplastic polymers.

Since porous sheets made of the thermoplastic elastomers are likely difficult to release from net or roll, the surface of net or roll is preferably subjected to treatment for making the release easy.

Figure 4:
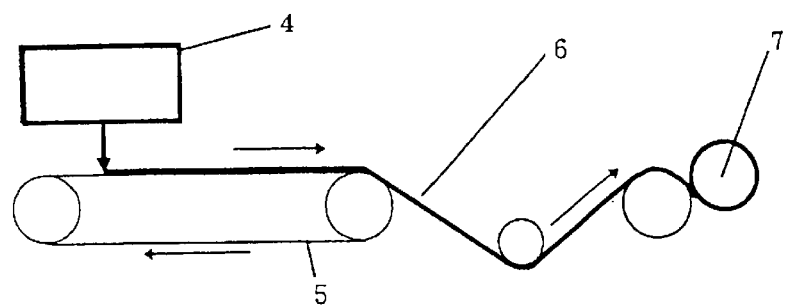
FIG. 4 is a schematic illustration showing a process of producing porous sheets of the present invention.
Figure 5:
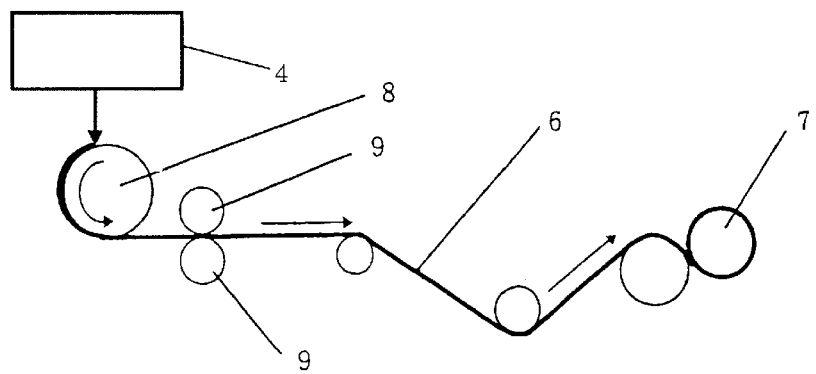
FIG. 5 is a schematic illustration showing another process of producing porous sheets of the present invention.

The method for producing the porous sheets of the present invention is not particularly limited so long as porous sheets having the sheet structures mentioned above are produced. For example, the porous sheets of the present invention may be produced via the production steps shown in FIGS. 4 and 5, in which like reference numerals indicate like parts. In FIGS. 4 and 5, a molten polymer is extruded from a melt extruder 4 having a line of nozzles (not shown). Simultaneously, high-temperature, high-pressure air is allowed to jet from slits (not shown) disposed on both the sides of nozzle outlets, thereby making the extruded molten polymer into fine fiber-like bodies which are then collected and stacked on a collecting device such as a conveyor net 5 as shown in FIG. 4 and a collecting roll 8 as shown in FIG. 5. Porous sheet 6 thus formed is taken up by a winding device 7. When the distance between the nozzle outlet and the collecting surface (hereinafter referred to as "collecting distance") is too long, the porous sheets of the present invention cannot be obtained because the resultant sheets become non-woven fabrics.

To produce the porous sheets characterized by a cross section having a specific polymer packing and a specific number of particular polymer sections, and further characterized by a particular network structures on either or both the opposite surfaces, the collecting distance is preferably set at 8 cm or less, more preferably 5 cm or less, and most preferably 4.5 cm or less. Since the molten polymer adheres to the nozzle surface and the sheet formation becomes difficult when the collecting distance is too short, the collecting distance is preferably 1 cm or longer.

When porous sheets formed on the conveyor net 5 as shown in FIG. 4 is difficult to release from the net for taking up, the surface of the net is preferably subjected to treatment for making the release easier such as application of oil or a releasing agent, treatment by teflon, sprinkling of water, etc.

Alternatively, porous sheets may be formed on the collecting roll, for example, a metal roll 8 as shown in FIG. 5 having a diameter of 5 to 100 cm, and taken up while supported by support rolls 9. Like the conveyor net, the collecting roll may be water-cooled and subjected to surface treatment such as teflon coating to make the release of porous sheet easier. In some cases, the collecting roll may be heated to facilitate the sheet formation.

The surface of the collecting roll may be mirror-polished, and the surface of the collecting device such as a conveyor net and a collecting roll may be patterned to form decorative patterns on the resultant porous sheets.

Although suitably varied depending on the kind of polymer to be used and the intended sheet structure, the nozzle temperature of the melt extruder is preferred to be set within a range so that the molten polymer being extruded from the nozzles has a melt viscosity of preferably 5 to 50 Pa·s, more preferably 5 to 30 Pa·s. The temperature of the high-pressure air jetted from the slits is preferably the same or nearly the same as the nozzle temperature. The flow rate of air jet per unit length of slit is preferably 0.01 to 0.2 Nm$^3$/(cm·min) in view of producing porous sheets with high quality stably. The temperature of the collecting surface is preferably about 100 to 200° C. lower than the nozzle temperature.

In the process shown in FIG. 5, a conveyor net may be disposed under the collecting roll 8 in place of the support rolls 9. However, in some cases, the stable production of sheets may be prevented because sticking of molten polymer dusts to the conveyor net is likely to occur. To eliminate this problem, it is preferred to rotate the collecting roll 8 in a direction opposite to the direction shown in FIG. 5 and shift the center axis of the collecting roll 8 upstream along the moving direction of sheets by about 1 to 50 mm from a position just under the array of nozzles.

The porous sheets of the present invention produced by the methods described above are good in soft texture and highly resistant to fluff formation by rubbing, and have a moderate air permeability of preferably 0.3 to 100 cc/(cm$^2$·s), more preferably 0.5 to 30 cc/(cm$^2$·s) depending on the production conditions. With such properties, the porous sheets of the present invention may be used alone or as composite materials with another non-woven fabric, etc. in wide applications of clothing or non-clothing fields. Specifically, the porous sheets of the present invention are effective as medical or sanitary materials such as substrates for first-aid sticking plasters, substrates for poultices on which pharmaceuticals are spread, dressings, parts of disposable diapers, etc., and packaging materials for food products and other products.

The present invention will be explained in more detail by reference to the following example which should not be construed to limit the scope of the present invention.

(A) Sectional Polymer Packing of Porous Sheet

A x500 sectional photomicrograph of porous sheet was analyzed by an image analyzer manufactured by Toyobo Co., Ltd. to determine the sectional area of each polymer sections, the total area thereof and the sectional area of the porous sheet. In addition, the number of polymer sections having a sectional area of 0.001 mm$^2$ or less on the photomicrograph was counted.

(1) Calculation of Sectional Area of Sheet

On a x500 sectional photomicrograph of porous sheet, a series of points in the contours defining respective opposite surfaces of the sheet were connected in order at intervals of 50±10 μm over a length of one millimeter along the surface. The resultant lines were assumed as the lines defining the opposite surfaces of the sheet and the area between the lines was calculated as the sectional area of the sheet (apparent sectional area).

The sectional area of a sheet in a laminated composite structure was calculated in the same manner as above on a sectional photomicrograph of the composite structure.

(2) Calculation of Polymer Packing

Calculated from the following formula:

Polymer packing (%)=[(total area of polymer sections)/(sectional area of sheet)]×100

(B) Abrasion Resistance

Fluff formation was examined by pilling test (ART method) according to JIS L 1076.

(C) Air Permeability

Measured by a Frazier air permeability tester (Frazier Precision Instrument Co.) according to JIS L 1096.

(D) Breaking Strength and Elongation at Break

Measured by a tensile tester (Autograph manufactured by Shimadzu Corporation) according to JIS L 1096.

EXAMPLE 1

Molten thermoplastic polyurethane (Kuramiron U of Kuraray Co., Ltd.) was extruded at a nozzle temperature of 240° C. and an extrusion rate of 0.5 g/min per nozzle from a melt extruding apparatus having 400 circular nozzles aligned in a line. The nozzles was 0.3 mm in diameter and slits of 1.2 mm width for heated gas jet were disposed on both sides of the array of nozzles. Air heated to the same temperature as the nozzle temperature was jetted from the slits at a flow rate of 0.1 Nm$^3$/(cm·min), thereby collecting the thin fiber-like polyurethane on a steel roll with 16 cm diameter disposed under the nozzles at a collecting distance of 2.5 cm. The resultant fibrous structure was taken up by a winding device to obtain porous sheet having a basis weight of 64.2 g/m$^2$ and a thickness of 0.148 mm.

The polymer packing of the sheet was 76.0% and the number of polymer sections having a sectional area of 0.001 mm$^2$ or less was 5 per millimeter. The observation under scanning electron microscope showed that the surfaces of the sheet were in the network structure (b). No fluff formation occurred by the pilling test.

The sheet was comfortably used as a substrate for poultices without causing oppressive damp feeling and fluff formation while preventing the pharmaceutics spread thereon from immediate dry.

EXAMPLE 2

In the same manner as in Example 1 except for changing the collecting distance to 3.5 cm, a porous sheet having a basis weight of 62.9 g/m$^2$ and a thickness of 0.135 mm was obtained.

The polymer packing of the sheet was 70.1% and the number of polymer sections having a sectional area of 0.0001 to 0.001 mm$^2$ was 35 per millimeter. The observation under scanning electron microscope showed that the surfaces of the sheet were, nearly half-and-half, in the network structures (a) and (b). No fluff formation occurred by the pilling test.

The sheet was comfortably used as a substrate for first-aid sticking plasters without causing oppressive damp feeling and fluff formation.

EXAMPLE 3

In the same manner as in Example 2 except for changing the nozzle temperature to 250° C., a porous sheet having a basis weight of 70.2 g/m$^2$ and a thickness of 0.173 mm was obtained. The polymer packing of the sheet was 81.6% and the number of polymer sections having a sectional area of 0.001 mm$^2$ or less was 3 per millimeter. No fluff formation occurred during the pilling test. The observation under scanning electron microscope showed that the surfaces of the sheet were in the network structure (b).

EXAMPLE 4

In the same manner as in Example 1 except for changing the collecting distance to 7.5 cm, a porous sheet having a basis weight of 62.0 g/m$^2$ and a thickness of 0.137 mm was obtained. The polymer packing of the sheet was 47.1% and the number of polymer sections having a sectional area of 0.001 mm$^2$ or less was 58 per millimeter. No fluff formation occurred during the pilling test.

The observation under scanning electron microscope showed that the surfaces of the sheet were substantially in the network structure (a) and partly the network structure (b).

EXAMPLE 5

In the same manner as in Example 2 except for using polyolefin elastomer (Engage manufactured by Du Pont•Dow Elastomer Co., Ltd.) and changing the nozzle temperature to 310° C. and the extrusion rate to 0.45 g/min per nozzle, a porous sheet having a basis weight of 100.1 g/m$^2$ and a thickness of 0.308 mm was produced. The polymer packing of the sheet was 69.3% and the number of polymer sections having a sectional area of 0.001 mm$^2$ or less was 10 per millimeter. No fluff formation occurred during the pilling test.

The observation under scanning electron microscope showed that the surfaces of the sheet were substantially in the network structure (a) and partly the network structure (b).

EXAMPLE 6

In the same manner as in Example 2 except for using polypropylene and changing the nozzle temperature to 310°

C. and the extrusion rate to 0.3 g/min per nozzle, a porous sheet having a basis weight of 17.9 g/m² and a thickness of 0.078 mm was produced. The polymer packing of the sheet was 53.3% and the number of polymer sections having a sectional area of 0.001 mm² or less was 28 per millimeter. No fluff formation occurred during the pilling test.

The observation under scanning electron microscope showed that the surfaces of the sheet were substantially in the network structure (a) and partly the network structure (b).

Comparative Example 1

In the same manner as in Example 1 except for changing the collecting distance to 15 cm, a porous sheet having a basis weight of 58.8 g/m² and a thickness of 0.156 mm was produced. The polymer packing of the sheet was 28.9% and the number of polymer sections having a sectional area of 0.001 mm² or less was 110 per millimeter. A lot of fluff was formed during the pilling test. The observation under scanning electron microscope showed that the surfaces of the sheet were in a structure typical for the known non-woven fabrics, i.e., a structure formed by fibers which were merely held together by adhesion at their intersections without being melt-bonded to form integral structure.

The properties of the sheets obtained in the above examples and comparative example are shown in Table 1.

Reference Example 1

A thermoplastic polyurethane was extruded into a film having a basis weight of 20.0 g/m² and a thickness of 34 μm. The air permeability of the film lower than 0.1 cc/(cm²·s).

Reference Example 2

A polypropylene porous film (manufactured by 3M Company) having a basis weight of 21.8 g/m² and a thickness of 34 μm was tested. The polymer packing was 70% and the air permeability was lower than 0.1 cc/(cm²·s).

TABLE 1

| | Basis weight | Thickness | Breaking strength g/5 cm | | Elongation % | |
|---|---|---|---|---|---|---|
| | g/m² | mm | MD[*1] | CD[*2] | MD[*1] | CD[*2] |
| Examples | | | | | | |
| 1 | 64.2 | 0.148 | 1840 | 1000 | 820 | 540 |
| 2 | 62.9 | 0.135 | 2000 | 1120 | 1020 | 660 |
| 3 | 70.2 | 0.173 | 2100 | 1820 | 830 | 815 |
| 4 | 62.0 | 0.137 | 1840 | 1090 | 710 | 600 |
| 5 | 100.1 | 0.308 | 4200 | 3100 | 85 | 170 |
| 6 | 17.9 | 0.078 | 1300 | 680 | 5 | 34 |
| Comparative Example | | | | | | |
| 1 | 58.8 | 0.156 | 1280 | 800 | 740 | 650 |

*[1]Machine Direction.
*[2]Cross Direction.

TABLE 1-continued

| | Air permeability cc/(cm²·s) | Polymer packing % | Fluff formation | Number of polymer sections having a sectional area of 0.001 mm² or less per mm | Soft texture |
|---|---|---|---|---|---|
| Examples | | | | | |
| 1 | 28.9 | 76.0 | None | 5 | Good |
| 2 | 12.3 | 70.1 | None | 35 | Good |
| 3 | 1.4 | 81.6 | None | 3 | Good |
| 4 | 18.6 | 47.1 | None | 58 | Good |
| 5 | 16.4 | 69.3 | None | 10 | Good |
| 6 | 88.1 | 53.3 | None | 28 | Good |
| Comparative Example | | | | | |
| 1 | 36.0 | 28.9 | Occurred | 110 | Good |

As seen from the results, the porous sheets of the present invention have a moderate amount of empty space and show a good soft texture unachievable in known porous films. Additionally, the porous sheets of the present invention is excellent in the air permeability and abrasion resistance.

As described above, according to the present invention, porous sheets which are highly resistant to fluff formation by rubbing and good in soft texture and have a moderate air permeability are easily produced. For example, a first-aid sticking plaster having a substrate made of the porous sheet of the present invention is used comfortably without causing oppressive damp feeling and fluff formation.

What is claimed is:

1. A porous sheet comprising a thermoplastic polymer, a cross section of the porous sheet having a polymer packing of 30 to 90% and containing 2 to 100 polymer sections having a sectional area of 0.001 mm² or less per millimeter along the surface of the porous sheet, and at least one surface of the porous sheet being in the following net-work structures (a) and/or (b):

(a) net-work structure formed by fiber bodies which are integrally bonded to each other at intersections by fusion of polymer constituting the fiber bodies;

(b) net-work structure formed by fiber protrusions.

2. The porous sheet according to claim 1, having an air permeability of 0.3 to 100 cc/(cm²·s).

3. The porous sheet according to claim 1, wherein the thermoplastic polymer is a thermoplastic elastomer.

4. A substrate for poultices, which is made of the porous sheet as defined in claim 1.

5. A substrate for first-aid sticking plasters, which is made of the porous sheet as defined in claim 1.

* * * * *